Sept. 22, 1970 — H. R. BUCY — 3,529,657
VACUUM FILLED MOLD
Filed Oct. 17, 1967 — 2 Sheets-Sheet 1
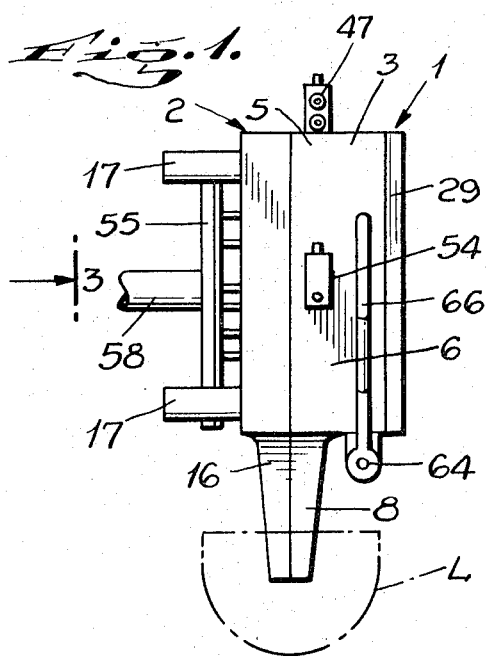
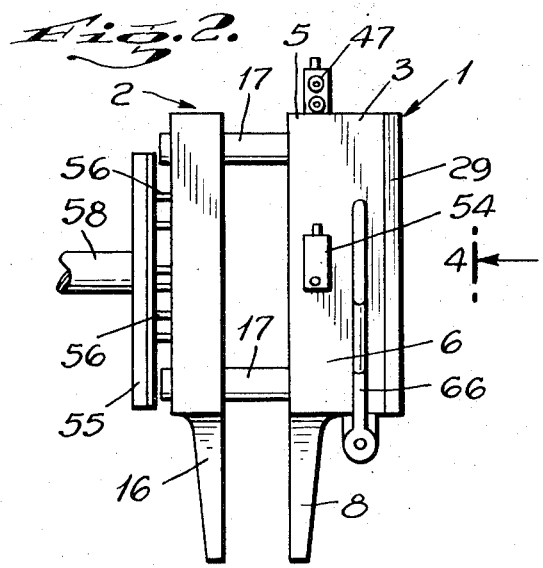
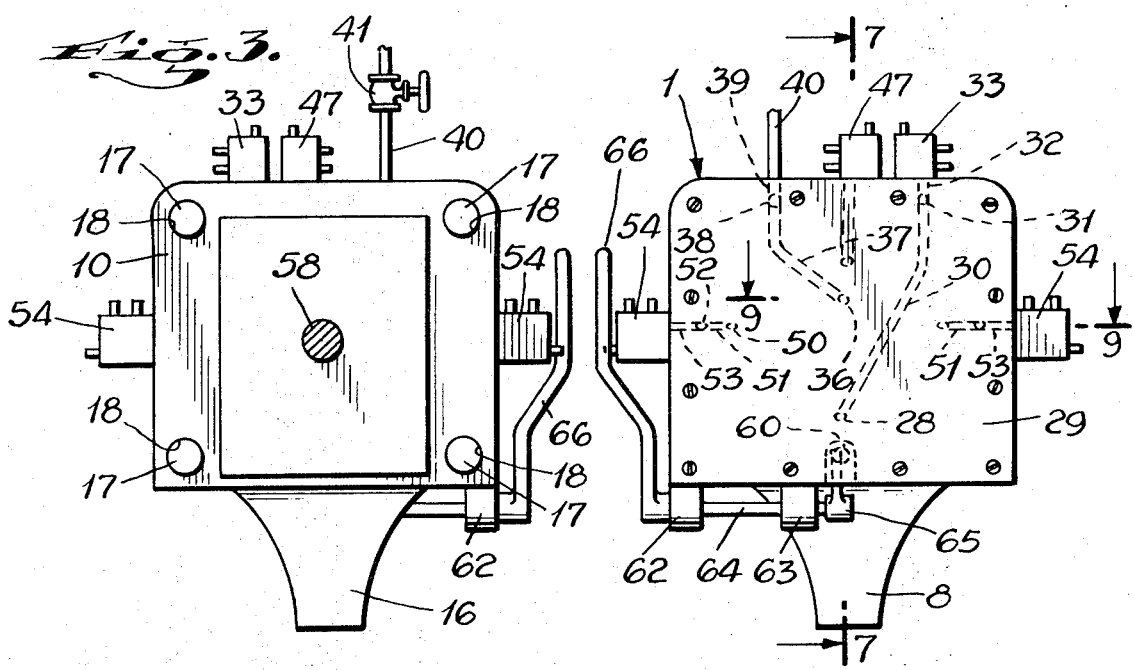
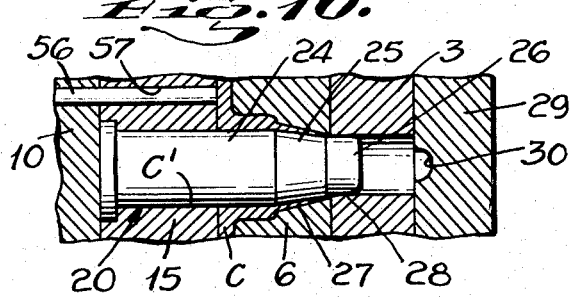
INVENTOR.
HARRY R. BUCY
BY Spensley Horn
ATTORNEYS Sept. 22, 1970    H. R. BUCY    3,529,657
VACUUM FILLED MOLD
Filed Oct. 17, 1967    2 Sheets-Sheet 2
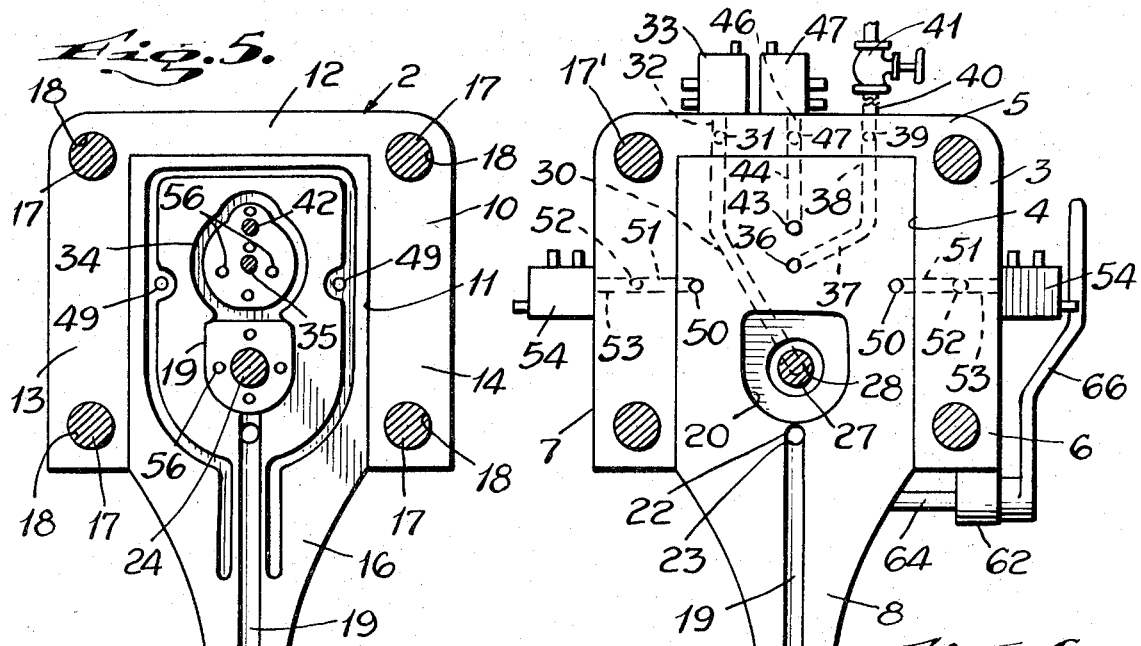
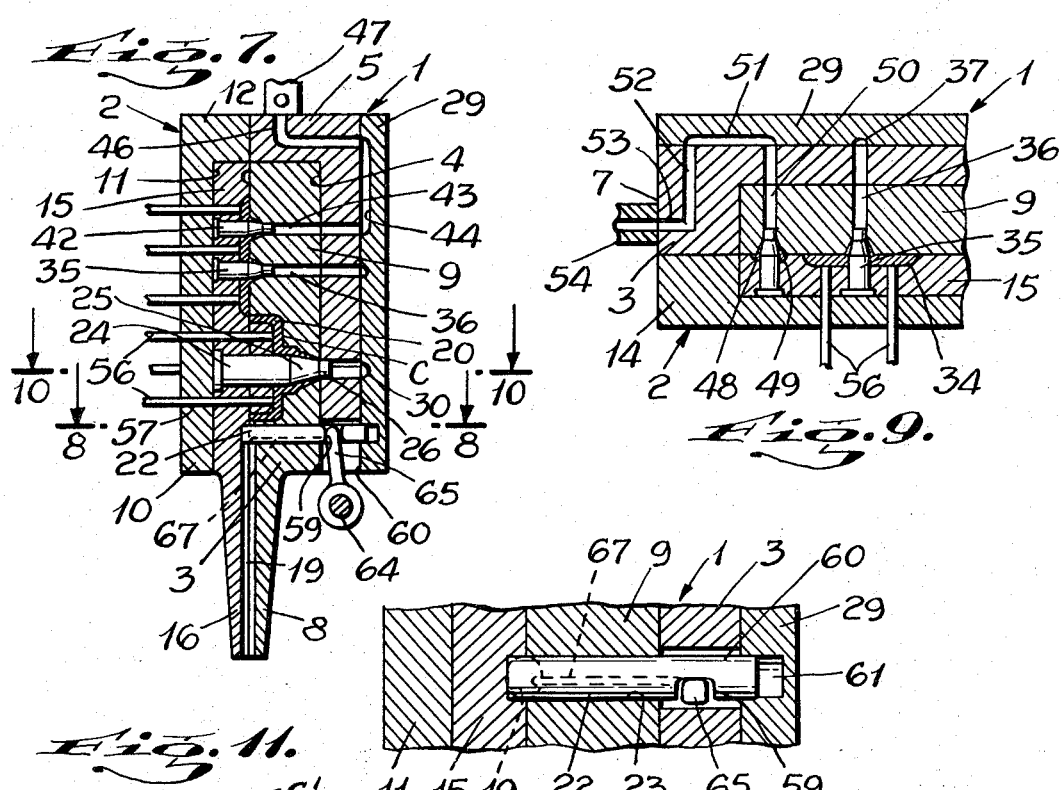
INVENTOR.
HARRY R. BUCY
BY Spensley Horn
ATTORNEYS United States Patent Office 3,529,657
Patented Sept. 22, 1970

3,529,657
VACUUM FILLED MOLD
Harry R. Bucy, 625 S. Glenwood Place,
Burbank, Calif. 91506
Filed Oct. 17, 1967, Ser. No. 675,969
Int. Cl. B22d 27/16
U.S. Cl. 164—257                 19 Claims

ABSTRACT OF THE DISCLOSURE

A separable mold for forming castings from congealable material in which the mold includes a filler runner upwardly into the mold cavity means. The cavity means is provided with evacuating means and a stop member is operable to institute or interrupt communication between the runner and the cavity. When the mold is closed, the cavity is evacuated sufficiently to cause the flow of congealable material through the runner to the cavity means, the stop member being moved out of the runner, and atmospheric pressure on the surface of a body of metal into which the lower end of the mold extends causes the congealable material to enter the mold cavity means through the runner. Means is provided to regulate the degree of vacuum so that the rate of filling of the mold cavity means is such as to reduce the initial flow rate of the entering material sufficiently to prevent the initial entry thereof in the form of an air entraining jet into cavity means.

BACKGROUND OF THE INVENTION

Field of the invention

The invention relates to separable molds for forming castings in which, unlike pressure injection of the fluid material, negative pressure is employed as the means for effecting the filling of the cavity by ambient atmospheric pressure exerted on the fluid material from which the casting is to be formed.

Prior art

No pertinent prior art is known to applicant.

SUMMARY OF THE INVENTION

The invention relates to the art of permanent mold casting and more particularly to a separable mold forming a mold cavity adapted to be filled through a runner extending upwardly to the cavity. A stop member is disposed in the runner adjacent the cavity and is operable to permit or prevent the flow of fluid, congealable material into the cavity. The cavity is connected to vacuum producing means for inducing the flow of the material into the cavity and the mold is sealed against the entry of air between the juxtaposed mold faces by a groove surrounding the cavity and runner and associated vacuum means connected to that groove. Additionally, means is provided for regulating the rate of filling of the mold cavity so that the initial rate of filling is relatively slow and can be increased with the result that the first entering material is caused to enter at an initial rate which is incapable of entering as an air entraining jet and said first entering material thereafter acts as a buffer to allow a more rapid subsequent flow rate of material into the mold cavity. All of the orifices through which air is evacuated or allowed to enter the mold cavity contain portions of such narrow width that only air and gas can pass therethrough.

BRIEF DESCRIPTION OF THE DRAWINGS

In the attached drawings which form a part of the following specification and which illustrate, by way of example, a presently preferred embodiment of the invention;

FIG. 1 is a side elevational view of a mold constituting a presently preferred embodiment of the invention, the mold being shown in closed position;

FIG. 2 is a side elevational view similar to FIG. 1 but showing the mold in its open or separated position;

FIG. 3 is an end elevational view of the ejector half of the mold as viewed from the left hand end of FIGS. 1 and 2;

FIG. 4 is an end elevational view of the cover half of the mold as viewed from the right hand end of FIGS. 1 and 2;

FIG. 5 is an enlarged scaled elevational view of the die face side of the ejector half of the mold;

FIG. 6 is an enlarged scale elevational view of the die side of the cover half of the mold;

FIG. 7 is a vertical sectional view taken on the line of the line 7—7 of FIG. 4;

FIG. 8 is an enlarged fragmentary sectional plan view taken on the line 8—8 of FIG. 7;

FIG. 9 is a fragmentary sectional plan view taken on the line 9—9 of FIG. 4;

FIG. 10 is an enlarged fragmentray sectional view taken in the plane of the line 10—10 of FIG. 7; and, FIG. 11 is a perspective view of the casting formed in the illustrated mold.

DETAILED DESCRIPTION OF THE PREFERRED EMBODIMENT

Before proceeding with the detailed description of the disclosed embodiment of the invention it should be borne in mind that while the invention will find its greatest utility in the field of metal casting, the uility extends as well to any initially fluid material which is congealed within a practicably short interval. Accordingly, while the term "fluid" will be employed in the specification, it will be understood to include any congealable material which can thus form a casting, whether that fluid condition derives from melting or other circumstance.

Referring to the drawings there is shown a casting C formed in the illustrated mold, said mold comprising a cover half 1 and an ejector half 2. The cover half comprises a die shoe 3 having a die block cavity 4 bounded by a top wall 5 and side walls 6 and 7, the lower edge of the cavity being opened for a downward extension 8 of a die block 9 seated in the cavity for a purpose presently to be explained. The ejector half 2 correspondingly comprises an ejector half die shoe 10 having a die block cavity 11 bounded by a top wall 12 and side walls 13 and 14 which are mirror image duplicates of corresponding walls of the cover half and an ejector die block 15 is seated in said cavity, said die block having a downward extension 16 which is a mirror image duplicate of the extension 8 of the die block 9.

Guide pins 17 carried by the cover half die shoe at the opposite ends of the side walls 6 and 7 engage complementary bores 18 in the ejector half die shoe to preserve alignment of the halves incident to opening and closing of the mold. Any suitable mechanism for mounting the halves for movement thereof into and out of close position may be employed, for example where metal molding is involved, an injection die casting machine may be so employed with the metal injection means being disabled and a filling means peculiar to the present invention substituted therefor.

The die block portions 8 and 16 taper downwardly and opposed grooves in the meeting faces thereof form a runner 19 extending from the lower end thereof to a casting cavity contoured to form the casting C, said cavity being bounded by the die face of the ejector die block, a core member 20 on the face of the ejector die block, and a complementary cavity portion 21 formed in the die face of the cover die block 9. Adjacent to the casting cavity above defined, the runner is interrupted by a stop member 22 comprising in the illustrated embodiment, an endwise reciprocable cylindrical bar carried by and guided in a bore 23 extending horizontally through the cover die block and the cover die shoe. Manually operable means is provided for moving the stop member into and out of material flow interrupting position in the runner as will presently be described.

The illustrated casting has an opening C' extending therethrough and said opening is formed by the body portion 24 of the cylindrical core member 20 carried by the ejector die block, said body portion tapering, as at 25 at the outer end of the opening to a reduced diameter pilot end 26. The cover die is formed with a bore including a tapered portion 27 of slightly greater angle than the tapered portion 26 of the core member and straight point 28 which is only sufficiently larger than the pilot end 26 to form an annular orifice through which only air and gas can flow. The outer face of the cover die block carries a cover plate 29, the inner face of which is provided with a groove 30 having one end thereof in registry with the bore 28 and the other end in registry with a bore 31 in the top wall 5 which, in turn, communicates with a bore 32 leading to the outer surface of the top wall 5 for communication with a vacuum producing means 32 here shown as jet jump device like shown in my prior Pat. 3,108,399 but which can be any suitable source of vacuum and which may be mounted at a point remote from the mold and connected to bore 32 by suitable conduit means if desired. This type of vent is like that shown and designated as a "breather" in my above identified prior patent and similar venting means hereinafter to be referred to will be understood to involve the same principles of construction and operation and will not be described in detail.

The ejector die block upstream of the cavity for the casting C is provided with a surplus material cavity 34 connected to the casting cavity by gate 34', said surplus cavity having a first breather means including a core 35 cooperating with the inner end of a bore 36 and the outer end of said bore registering with one end of a groove 37 in the plate 29, the other end of said groove communicating through bores 38 and 39 in the cover die shoe top wall with a conduit means 40 having a valve 41 operable for a purpose presently to be described. Additionally, the cavity 34 is provided with a second breather including a core 42 cooperating with the inner end of a bore 43 and the outer end of said bore communicating with one end of a groove 44 on the outer face of the cover plate 29. The other end of this groove communicates with a vacuum producing means through bores 45 and 46 in the top wall 5. The said vacuum means is here shown as a jet pump device 47 similar to the jet pump device 33 and which may be mounted on the die shoe as shown or may be connected to the bore 46 by suitable conduit means.

The die face of the ejector die block is provided with a groove 48 bordering the die cavity, and the upper portion of the runner 19, said groove being widened at one or more points in its length to afford clearance for breather devices, two such points being shown in the illustrated embodiment, said clearances including cores 49 carried by the ejector die block and cooperating with the inner ends of bores 50 in the cover die which in turn, through grooves 51 in the cover and intersecting bores 52 and 53 in each of the side walls 6 and 7 communicate with vacuum producing devices 54 which, like those previously described, are shown as jet pump devices and which may be mounted on or be remote from the mold as may be most convenient.

Associated with the ejector half is an ejector pin means comprising a plate 55 and to which a series of ejector pins 56 is connected, said ejector pins being slidable in bores 57 extending through the ejector half of the mold to the cavities therein. On its outer face, the ejector plate is provided with operating means here shown as a shank 58 by which as an incident to opening the mold, the plate is moved, by mechanism not shown, toward the ejector half causing the ejector pins to dislodge a casting formed in the cavities from the cavities and also free of any core elements projecting into or through the cavities. This is the usual and normal operation of ejector pin means in permanent molds.

The runner stop member 22 in the portion thereof extending through the back of the cover die shoe is provided with a transverse notch 59 and the lower edge of the die shoe is provided with an upwardly extending notch 60 across which the stop member extends into a recess 61 formed in the cover plate 29. The cover die shoe is provided with spaced, depending bearing lugs 62 and 63 in which a horizontal rock shaft 64 is journaled. The bearing lug 63 is adjacent to one side of the notch 60 and the remote face of the bearing lug 62 is in the plane of the side face of the cover die shoe. The end of the shaft projecting across the notch 60 carries a lever arm 65 which terminates in an upwardly extending distal end engaging the notch 59 in the stop member 22 and the opposite end of the shaft carries a hand lever 66 operable to move the stop member out of and into the runner 19 to permit or prevent the flow of the fluid material therethrough. Additionally, the lower surface of the stop member is provided with a longitudinal groove 67 extending from the notch 39 to a point within the runner when the stop member is in closed position but which is within the bore 23 when the stop member is moved out of the runner. Thus, when the stop member is in closed position, the groove 67 is open to the runner to allow air to enter and the material in the runner to fall back into the ladle.

To describe a typical casting operation employing a mold embodying the present invention, it will be assumed that the mold is mounted in a suitable mechanism for opening and closing the mold and that it is being held in closed position and it will be further assumed that either through physical manipulation of the mold vertically or manipulation of a ladle or other container L of fluid material relative to the mold, that the lower end of the mold is immersed in the fluid material.

With the runner stop member moved out of the runner, a high vacuum is applied to the sealing groove 48 and a vacuum is also applied to the surplus cavity by vacuum producing means applied to the breather 47, the magnitude of that vacuum being less than that in the groove 48 by reason of air entering both through the casting cavity breather and through the then open valve 41 and the associated breather bore 36 whereupon, the ambient air pressure acting on the material in the ladle will cause the material to rise somewhat slowly through the runner 19 and to begin to fill the mold cavities. The valve 41 is then gradually closed resulting in a higher vacuum in the connected cavities and a resultant increase in the rate of metal flow into the cavity. If the initial entry of the metal into the cavities was too rapid, the material would enter through the runner in a spurt which, upon reaching the greater space of the cavity, would break up into a virtual jet entraining air and resulting in a porous casting. By thus causing the initial entry of the fluid material to be relatively slow, that material remains in a mass and in effect serves as a buffer to prevent this air entraining tendency from occurring regardless of the subsequent increase in the flow rate in filling the mold cavities. When the cavities have been filled as indicated by the stoppage of material flow, the stop member is moved to interrupt flow through the runner to prevent the material from falling back into the ladle except for that which extends below the stop member in the runner 19 which falls back due to the entry of air through the groove 67 in the stop member, the downstream end of said groove (see FIG. 7) having been brought into communication with the groove incident to movement of the stop member across the runner. When the casting has been congealed, the mold is opened with attendant dislodgement of the casting by the ejector pins, the casting is removed, the cavities cleaned and lubricated and the mold is closed ready for the next casting operation. In this connection, the surplus metal cavity is disposed above the casting cavity for three reasons. First, any air entrained in the initially entering metal is moved out of the casting cavity. Second, this insures that the casting cavity will be filled. Third, upon closing the stop member, the still fluid material in the surplus cavity can descend to the casting cavity to compensate for shrinkage.

In some circumstances, particularly with materials having a high viscosity it may be advisable to have the runner stop means closed at the time of immersion of the open end of the runner in the fluid material since there will be enough air leakage around the runner stop to allow the material to be brought up to the runner stop before it is moved to open position. Under those circumstances it would be likely that the air ingress means would be shut off to increase the speed of cavity fill. These factors will vary both with the configuration of the casting and the character of the molding material in its fluid state.

It will be appreciated that for castings of other configurations, other designs of cavities, sealing grooves, breathers and the like would be required, but in the light of the foregoing teaching, the artisan skilled in the permanent mold or pressure die casting art would have no difficulty designing molds embodying the principles of this invention to produce such other castings. Actually, molds originally intended for either hot chamber or cold chamber pressure injection molding machines may be converted to use for the present invention.

In all such molds, any side vents in the mold faces would be filled, a vacuum sealing groove comparable to the groove 48 and suitable connections to vacuum producing means would be installed, as would one or more surplus material cavities corresponding to the cavity 34 including appropriate ejector pins, evacuating means and regulatable air ingress means associated with the surplus material cavity or cavities. Also the cover half of such molds would be provided with a runner stop means.

For those molds originally intended for hot chamber die casting machines, no further changes in the molds per se would be required, but the injecting piston associated with the hot metal gooseneck would be rendered inoperative or else would be removed so that ambient air pressure on the molten metal body would effect filling of the mold cavity or cavities. For those molds intended for cold chamber die casting machines, the sprue hole would be blocked, both mold halves would be provided with downward extensions corresponding to the downward extensions 8 and 16 of the illustrated embodiment and the runner would be extended downwardly to the lower extremity of those extensions.

Accordingly, the invention is not to be deemed to be limited to the precise details of construction thus disclosed by way of example, and it will be understood that the invention includes as well as such changes in modifications in the parts and in the construction, combination and arrangement of parts as shall come within the purview of the appended claims.

I claim:

1. In a mold having cavity means adapted to be filled with fluid material injected therein by atmospheric pressure by reason of evacuation of the cavity means, said mold including halves separable along a parting line so intersecting said cavity means that a casting formed therein may be removed therefrom upon separation of the mold halves, said mold having runner means affording connection of said cavity means with a body of casting material in fluid condition disposed at a level below said cavity means, a normally open control means disposed to intersect said runner means operable at will to close said runner means against the flow of fluid material occupying said cavity means out of said cavity means while permiting fluid material upstream thereof to return to said body of fluid, a vacuum producing means having the intake thereof in constant communication with said cavity means and manually variable means operable when said runner means is opened to afford connection between the body of fluid material and said cavity means to cause said vacuum producing means to fill said cavity means by the fluid material at a desired variable rate of flow.

2. A mold device as claimed in claim 1 in which said cavity means includes at least one casting forming cavity connected to said runner means and a surplus material cavity disposed above said casting cavity and connected to said casting cavity by a gate.

3. In a mold having cavity means adapted to be filled with fluid material injected therein by atmospheric pressure by reason of evacuation of the cavity means, said mold including halves separable along a parting line so intersecting said cavity means that a casting formed therein may be removed therefrom upon separation of the mold halves, said mold having runner means affording connection with a body of fluid disposed at a level below said cavity means, a normally open runner control means operable at will to close said runner means against the flow of fluid material therefrom, a vacuum producing means having the intake thereof in communication with said cavity means and operable, both when said runner means is closed to interrupt or opened to afford connection with the body of fluid material, to create a vacuum in said cavity means of sufficient magnitude to cause said cavity means to be filled by the fluid material when said runner means is placed in communication with said body of material by said runner control means, and an air ingress means having communication with said cavity means including means for regulating the rate of air flow into said cavity means through said ingress means while said cavity means is being subjected to evacuation by said vacuum producing means with resultant capacity for variation in the degree of vacuum and consequent variation in the rate of fill of said cavity by the fluid material in response to that vacuum.

4. In a mold having cavity means adapted to be filled with fluid material injected therein by atmospheric pressure by reason of evacuation of the cavity means, said mold including halves separable along a parting line so intersecting said cavity means that a casting formed therein may be removed therefrom upon separation of the mold halves, said mold having runner means affording connection with a body of fluid disposed at a level below said cavity means, a normally open runner control means operable at will to close said runner means against the flow of fluid material therefrom, a vacuum producing means having the intake thereof in communication with said cavity means and operable, to create a vacuum in said cavity means of sufficient magnitude to cause said cavity means to be filled by the fluid material when said runner means is placed in communication with said body of material by said runner control means, and an air ingress means having communication with said cavity means including means operable to regulate and vary the rate of air flow into said cavity means through said air ingress means, while said cavity means is being filled with resultant filling of said cavity means at such variable rate that a smooth flow of fluid material into said cavity means is achieved within a minimum of elapsed time for filling said mold.

5. A mold device as claimed in claim 1 in which said cavity means includes a first cavity connected to said runner and in which cavity the intended casting is formed and a surplus material cavity disposed downstream of said first cavity connected to said first cavity by a gate at a point on said first cavity remote from said runner means, said vacuum producing means being connected to said second cavity.

6. In a mold having cavity means adapted to be filled with fluid material injected therein by atmospheric pressure by reason of evacuation of the cavity means, said mold including halves separable along a parting line so intersecting said cavity means that a casting formed therein may be removed therefrom upon separation of the mold halves, said mold having runner means affording connection of said cavity means with a body of fluid disposed at a level below said cavity means, a normally open, runner control means disposed adjacent to said cavity and operable at will to close said runner means against the flow of fluid material occupying said cavity means to said body of fluid, and a vacuum producing means having the intake thereof in communication with said cavity means and operable, both when said runner means is closed and when said runner means is opened to interrupt or to afford connection with the body of fluid material, to cause said cavity means to be filled by the fluid material when said runner control means is placed in communication with said body of material by said runner control means; said runner control means including a reciprocable member carried by one of said halves which is optionally movable in a direction normal to the direction of fluid material flow through said runner means to extend across or move out of said runner means with resultant opening or closing of said runner means to the flow of fluid material into said cavity.

7. In a mold having cavity means adapted to be filled with fluid material injected therein by atmospheric pressure by reason of evacuation of the cavity means, said mold including halves separable along a parting line so intersecting said cavity means that a casting formed therein may be removed therefrom upon separation of the mold halves, said mold having runner means affording connection with a body disposed at a level below said cavity means, a normally open runner control means operable at will to close said runner means against the flow of fluid material therefrom, a vacuum producing means having the intake thereof in communication with said cavity means and operable, both when said runner means is closed to interrupt or opened to afford connection with the body of fluid material, to create a vacuum in said cavity means of sufficient magnitude to cause said cavity means to be filled by the fluid material when said runner means is placed in communication with said body of material by said runner control means, and said cavity means comprising a first cavity in which the intended casting is formed connected to said runner means and a surplus material cavity disposed above said first cavity and connected to said first cavity by a gate, said mold device further having an air ingress means connected to said surplus material cavity by conduit means including regulating means for the rate of flow of fluid material and in which said vacuum producing means is connected separately to said surplus material cavity.

8. A mold device as claimed in claim 3 in which said air ingress means and said vacuum producing means are separately connected to said surplus material cavity in which the connection of said air ingress means with said cavity is disposed above the point of communication and said vacuum producing means with said cavity.

9. A mold device as claimed in claim 3 in which said air ingress means includes an orifice disposed adjacent to said cavity means through which only air and gas can flow.

10. A mold device as claimed in claim 5 in which said surplus material cavity is disposed above said first cavity with resultant capacity to feed back fluid material to said first cavity to compensate for shrinkage in the casting formed in said first cavity.

11. A mold device as claimed in claim 7 in which the connection of said vacuum producing means and said air ingress means each includes an orifice adjacent to said second cavity through which only air and gas can flow.

12. A mold device having a cavity means adapted to be filled with fluid material injected therein by atmospheric pressure by reason of evacuation of the cavity means, said mold comprising separable halves and said halves having one each of a pair of downward extensions meeting along the parting line defined by said halves when the mold is closed, a runner defined by the meeting faces of said halves and including at least a portion of said faces of said extensions and extending from the distal ends of said extensions to said cavity means, a control means disposed intermediate the ends of said runner means and operable at will either to open said runner to the flow of fluid material therethrough into said cavity means or to close said runner to retain a charge of fluid material in said cavity means, and a vacuum producing means having the intake thereof in constant communication with said cavity means, and a manually variable air ingress means in communication with said cavity means operable, when said runner is opened and the distal ends of said extensions of the closed mold are submerged in a body of fluid material, to variably regulate the magnitude of a vacuum in said cavity means sufficient to cause said cavity means to be filled by the fluid material at a desired variable rate of flow when said runner is unobstructed by said control means.

13. A mold device as claimed in claim 12 in which said cavity means includes at least one casting cavity connected to said runner and a surplus material cavity disposed above said casting cavity and connected to said casting cavity by a gate.

14. In a mold device having a cavity means adapted to be filled with fluid material injected therein by atmospheric pressure by reason of evacuation of the cavity means, said mold comprising separable halves and said halves having one each of a pair of downward extensions meeting along said parting line when the mold is closed, a runner defined by the meeting faces of said halves and including at least a portion of said faces of said extensions and extending from the distal ends of said extensions to said cavity means, a runner control means operable at will to open or close said runner to the flow of fluid material therethrough, a vacuum producing means having the intake thereof in communication with said cavity means and operable, both when said runner is closed and when said runner is opened and the distal end thereof is submerged in a body of fluid material, to create a vacuum in said cavity means of sufficient magnitude to cause said cavity means to be filled by fluid material when said runner is unobstructed by said runner control means, and an air ingress means having communication with said cavity means including means for regulating the rate of air flow into said cavity means through said ingress means while said cavity means is being subjected to evacuation by said vacuum producing means with resultant capacity for variation of the degree of vacuum and consequent variation of the rate of fill of said cavity means by the fluid material in response to that vacuum.

15. In a mold device having a cavity means adapted to be filled with fluid material injected therein by atmospheric pressure by reason of evacuation of the cavity means, said mold comprising separable halves and said halves having one each of a pair of downward extensions meeting along a parting line when the mold is closed, a runner defined by the meeting faces of said halves and including at least a portion of said faces of said extensions and extending from the distal ends of said extensions to said cavity means, a runner control means operable at will to open or close said runner to the flow of fluid material therethrough, a vacuum producing means having the intake thereof in communication with said cavity means and operable, both when said runner is closed and when said runner is opened and the distal end thereof is submerged in a body of fluid material, to create a vacuum in said cavity means of sufficient magnitude to cause said cavity means to be filled by fluid material when said runner is unobstructed by said runner control means, said cavity means including a first cavity connected to said runner and in which the intended casting is formed, and a surplus material cavity disposed downstream of said first cavity and connected to said first cavity by a gate, said vacuum producing means being connected to said surplus material cavity, and a regulatable air ingress means connected to said cavity means and operable during the filling of said cavity means to variably regulate the rate of filling of said cavity means with fluid material.

16. A mold device as claimed in claim 15 in which said air ingress means is connected to said surplus material cavity by a conduit means having a flow rate regulating means, and in which said vacuum producing means is separately connected to said surplus material cavity.

17. In a mold device having a cavity means adapted to be filled with fluid material injected therein by atmospheric pressure by reason of evacuation of the cavity means, said mold comprising separable halves and said halves having one each of a pair of downward extensions meeting along said parting line when the mold is closed, a runner defined by the meeting faces of said halves and including at least a portion of said faces of said extensions and extending from the distal ends of said extensions to said cavity means, a runner control means disposed adjacent to said cavity means and operable at will either to open said runner to the flow of fluid material therethrough into said cavity means to close said runner to retain a charge of fluid material in said cavity means, and a vacuum producing means having the intake thereof in communication with said cavity means and operable, both when said runner is closed and when said runner is opened and the distal end of the closed mold is submerged in a body of fluid material, to create a vacuum in said cavity means of sufficient magnitude to cause said cavity means to be filled by fluid material when said runner is unobstructed by said runner control means; said runner control means including a reciprocable member carried by one of said halves and is optionally movable in a direction normal to the direction of material flow through said runner to extend across or move out of said runner with resultant opening or closing of said runner to the flow of fluid material into said cavity.

18. A mold device as claimed in claim 14 in which said air ingress means includes an orifice disclosed adjacent to said cavity means through which only air and gas is capable of flow.

19. A mold device as claimed in claim 16 in which the connections of said vacuum producing means and said air ingress means each includes an orifice adjacent to said surplus material cavity through which only air and gas can flow.

References Cited

UNITED STATES PATENTS

| | | | |
|---|---|---|---|
| 1,065,301 | 6/1913 | Dutton | 164—337 XR |
| 1,717,607 | 6/1929 | Kadow | 164—257 |
| 3,178,782 | 4/1965 | Bennett | 164—257 XR |
| 3,209,416 | 10/1965 | Morton | 164—312 XR |
| 3,247,550 | 4/1966 | Haines. | |
| 3,266,099 | 8/1966 | Bucy | 18—42 |
| 3,108,339 | 10/1963 | Bucy | 18—42 XR |

H. A. KILBY, Jr., Primary Examiner

U.S. Cl X.R.

18—30, 42; 164—133, 304, 337